US012771388B2

(12) United States Patent
Li et al.

(10) Patent No.: US 12,771,388 B2
(45) Date of Patent: Oct. 20, 2026

(54) ADAPTIVE AUTOMATIC GAIN CONTROL ALLOCATION

(71) Applicant: QUALCOMM Incorporated, San Diego, CA (US)

(72) Inventors: Qing Li, Princeton Junction, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 18/345,823

(22) Filed: Jun. 30, 2023

(65) Prior Publication Data

US 2025/0007546 A1 Jan. 2, 2025

(51) Int. Cl.

| | |
|---|---|
| ***H04B 1/10*** | (2006.01) |
| ***H04B 1/16*** | (2006.01) |
| ***H04L 5/00*** | (2006.01) |
| ***H04L 5/14*** | (2006.01) |
| ***H04L 5/16*** | (2006.01) |
| ***H04W 52/52*** | (2009.01) |
| ***H04W 72/25*** | (2023.01) |

(52) U.S. Cl.

CPC ............. *H04B 1/1027* (2013.01); *H04B 1/16* (2013.01); *H04W 52/52* (2013.01); *H04W 72/25* (2023.01)

(58) Field of Classification Search

None

See application file for complete search history.

(56) References Cited

U.S. PATENT DOCUMENTS 7,689,217 B2 * 3/2010 Ruelke ................. H03G 3/3068 455/434
11,490,341 B2 * 11/2022 Li ........................... H04W 4/40
12,232,148 B2 * 2/2025 Peng ..................... H04W 72/20
2009/0310690 A1 * 12/2009 Lee ...................... H03G 3/3078 375/345
2023/0198730 A1 6/2023 Gutman et al.
2023/0199675 A1 6/2023 Ryu et al.
2023/0224900 A1 * 7/2023 Elshafie ................ H04L 1/1896
2023/0262620 A1 * 8/2023 Sarkis ................... H04W 52/52 455/522
2024/0121731 A1 * 4/2024 Chuang ................. H04L 27/261
2024/0243824 A1 * 7/2024 Lee ...................... H04B 17/345
2024/0381376 A1 * 11/2024 Ryu ...................... H04W 72/25
2025/0175998 A1 * 5/2025 Wang .................... H04L 5/0053

FOREIGN PATENT DOCUMENTS

EP 3989507 A1 4/2022

OTHER PUBLICATIONS

International Search Report and Written Opinion—PCT/US2024/031620—ISA/EPO—Sep. 19, 2024.

* cited by examiner

*Primary Examiner* — Pablo N Tran

(74) *Attorney, Agent, or Firm* — QUALCOMM Incorporated

(57) ABSTRACT

Various aspects of the present disclosure generally relate to wireless communication. In some aspects, a receiving (Rx) user equipment (UE) may receive an automatic gain control (AGC) allocation configuration for a first AGC allocation. The Rx may receive one or more of an AGC allocation activation signal or an AGC allocation indication, the AGC allocation activation signal being associated with a second AGC allocation and the AGC allocation indication being associated with a third AGC allocation for a transport block. Numerous other aspects are described.

30 Claims, 12 Drawing Sheets

ADAPTIVE AUTOMATIC GAIN CONTROL ALLOCATION

FIELD OF THE DISCLOSURE

Aspects of the present disclosure generally relate to wireless communication and to techniques and apparatuses for adaptive automatic gain control allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a receiving (Rx) user equipment (UE) for wireless communication. The Rx UE may include one or more memories and one or more processors coupled to the one or more memories. The one or more processors may be configured to receive an AGC allocation configuration for a first AGC allocation. The one or more processors may be configured to receive one or more of an AGC allocation activation signal or an AGC allocation indication, the AGC allocation activation signal being associated with a second AGC allocation and the AGC allocation indication being associated with a third AGC allocation for a transport block.

Some aspects described herein relate to a Tx UE for wireless communication. The Tx UE may include one or more memories and one or more processors coupled to the one or more memories. The one or more processors may be configured to transmit an AGC allocation configuration for a first AGC allocation to an Rx UE. The one or more processors may be configured to transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

Some aspects described herein relate to a network node for wireless communication. The network node may include one or more memories and one or more processors coupled to the one or more memories. The one or more processors may be configured to receive an AGC allocation capability or a preferred AGC allocation. The one or more processors may be configured to transmit an AGC allocation configuration for a first AGC allocation to a Tx UE, the first AGC allocation being based, at least in part, on the AGC allocation capability or the preferred AGC allocation. The one or more processors may be configured to transmit an AGC allocation activation signal for a second AGC allocation to the Tx UE. The one or more processors may be configured to transmit a sidelink grant, to the Tx UE, the sidelink grant being for a third AGC allocation for a transport block from the Tx UE to an Rx UE.

Some aspects described herein relate to a method of wireless communication performed by an Rx UE. The method may include receiving an AGC allocation configuration for a first AGC allocation. The method may include receiving one or more of an AGC allocation activation signal or an AGC allocation indication, the AGC allocation activation signal being associated with a second AGC allocation and the AGC allocation indication being associated with a third AGC allocation for a transport block.

Some aspects described herein relate to a method of wireless communication performed by a Tx UE. The method may include transmitting an AGC allocation configuration for a first AGC allocation to an Rx UE. The method may include transmitting one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

Some aspects described herein relate to a method of wireless communication performed by a network node. The method may include receiving an AGC allocation capability or a preferred AGC allocation. The method may include transmitting an AGC allocation configuration for a first AGC allocation to a Tx UE, the first AGC allocation being based, at least in part, on the AGC allocation capability or the preferred AGC allocation. The method may include transmitting an AGC allocation activation signal for a second AGC allocation to the Tx UE. The method may include transmitting a sidelink grant, to the Tx UE, the sidelink grant being for a third AGC allocation for a transport block from the Tx UE to an Rx UE.

Some aspects described herein relate to a non-transitory computer-readable medium that stores a set of instructions for wireless communication by an Rx UE. The set of instructions, when executed by one or more processors of the Rx, may cause the Rx UE to receive an AGC allocation configuration for a first AGC allocation. The set of instructions, when executed by one or more processors of the Rx, may cause the Rx UE to receive one or more of an AGC allocation activation signal or an AGC allocation indication, the AGC allocation activation signal being associated with a second AGC allocation and the AGC allocation indication being associated with a third AGC allocation for a transport block.

Some aspects described herein relate to a non-transitory computer-readable medium that stores a set of instructions for wireless communication by a Tx UE. The set of instructions, when executed by one or more processors of the Tx, may cause the Tx UE to transmit an AGC allocation configuration for a first AGC allocation to an Rx UE. The set of instructions, when executed by one or more processors of the Tx, may cause the Tx UE to transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

Some aspects described herein relate to a non-transitory computer-readable medium that stores a set of instructions for wireless communication by a network node. The set of instructions, when executed by one or more processors of the network node, may cause the network node to receive an AGC allocation capability or a preferred AGC allocation. The set of instructions, when executed by one or more processors of the network node, may cause the network node to transmit an AGC allocation configuration for a first AGC allocation to a Tx UE, the first AGC allocation being based, at least in part, on the AGC allocation capability or the preferred AGC allocation. The set of instructions, when executed by one or more processors of the network node, may cause the network node to transmit an AGC allocation activation signal for a second AGC allocation to the Tx UE. The set of instructions, when executed by one or more processors of the network node, may cause the network node to transmit a sidelink grant, to the Tx UE, the sidelink grant being for a third AGC allocation for a transport block from the Tx UE to an Rx UE.

Some aspects described herein relate to an apparatus for wireless communication. The apparatus may include means for receiving an AGC allocation configuration for a first AGC allocation. The apparatus may include means for receiving one or more of an AGC allocation activation signal or an AGC allocation indication, the AGC allocation activation signal being associated with a second AGC allocation and the AGC allocation indication being associated with a third AGC allocation for a transport block.

Some aspects described herein relate to an apparatus for wireless communication. The apparatus may include means for transmitting an AGC allocation configuration for a first AGC allocation to an Rx UE. The apparatus may include means for transmitting one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

Some aspects described herein relate to an apparatus for wireless communication. The apparatus may include means for receiving an AGC allocation capability or a preferred AGC allocation. The apparatus may include means for transmitting an AGC allocation configuration for a first AGC allocation to a Tx UE, the first AGC allocation being based, at least in part, on the AGC allocation capability or the preferred AGC allocation. The apparatus may include means for transmitting an AGC allocation activation signal for a second AGC allocation to the Tx UE. The apparatus may include means for transmitting a sidelink grant, to the Tx UE, the sidelink grant being for a third AGC allocation for a transport block from the Tx UE to an Rx UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
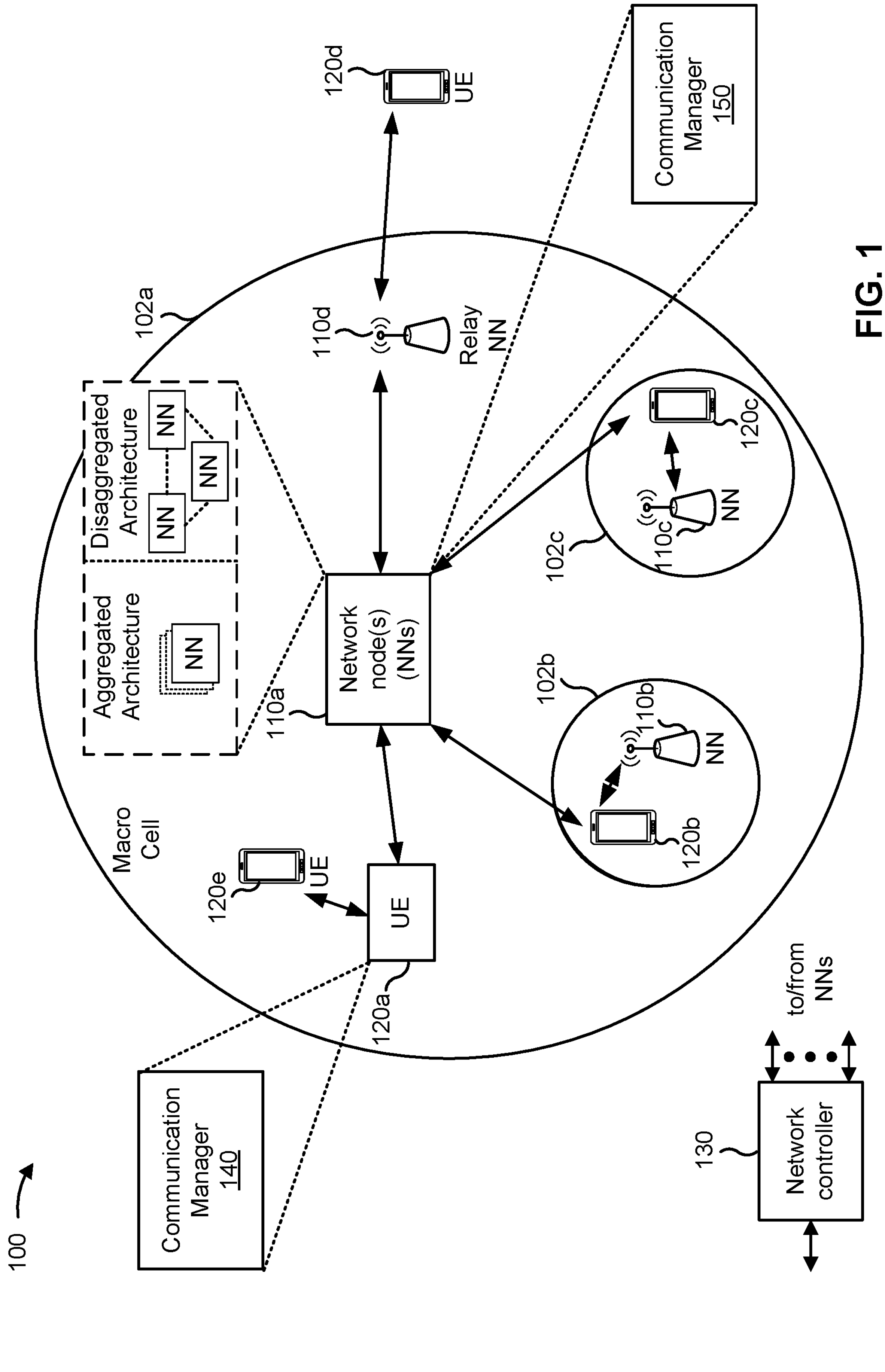
FIG. 1 is a diagram illustrating an example of a wireless network, in accordance with the present disclosure.

Automatic gain control (AGC) allows wireless communication systems to handle variations in signal strength. The goal of AGC is to allow a wireless device to maintain a consistent signal amplitude by automatically adjusting the gain of a receiver in response to changes in signal power. For example, the wireless device may measure the strength of signals from a transmitter and dynamically modify the AGC based on the measured signal strengths.

The AGC control loop includes components, such as a variable gain amplifier (VGA), a power detector, and a loop filter, that apply the AGC to incoming signals. For example, the incoming signal passes through the VGA where a gain of the incoming signal is adjusted based on a control voltage. The amplified signal is then fed to the power detector, which measures the power level of the amplified signal and compares the power level to a predefined reference level. If a discrepancy is detected, the control voltage may be adjusted accordingly, thereby modulating the gain of the VGA to bring the signal power closer to the reference level. This feedback loop may help to maintain the received signal power at the desired level.

The AGC control loop is associated with a settling time, which is the time required for the AGC loop to stabilize within a specified error margin following a step change in input signal level. The settling time is largely determined by the characteristics of the loop filter, which is designed to provide stability and to prevent oscillation in the AGC control loop. A faster settling time can allow the system to respond quickly to sudden changes in signal power, but it may also lead to instability or overshoot. A slower settling time provides better stability, but it might not respond quickly enough to rapid changes in signal power.

In networks with higher numerologies (e.g., 120 KHz sub-carrier spacing), the AGC settling time may take up to three or four orthogonal frequency division multiplexing (OFDM) symbols, which can be a significant number of resources, on the order of, for example, 21% or 28% of the resources of a 14-symbol slot.

Various aspects relate generally to adaptive AGC techniques, such as AGC techniques that can be dynamically modified under certain circumstances. Some aspects more specifically relate to adaptive AGC techniques for sidelink communications. In some examples, a user equipment (UE) receives one or more of an AGC allocation activation signal or an AGC allocation indication, the AGC allocation activation signal being associated with a second AGC allocation and the AGC allocation indication being associated with a third AGC allocation for a transport block. In some examples, a UE transmits one or more of an AGC allocation activation signal or an AGC allocation indication, the AGC allocation activation signal being associated with a second AGC allocation and the AGC allocation indication being associated with a third AGC allocation for a transport block. In some examples, a network node transmits an AGC allocation activation signal for a second AGC allocation to a transmitting UE (Tx UE) and transmits a sidelink grant, to the Tx UE, the sidelink grant being for a third AGC allocation for a transport block from the Tx UE to a receiving UE (Rx UE).

Particular aspects of the subject matter described in this disclosure can be implemented to realize one or more of the following potential advantages. In some examples, by receiving or transmitting one or more of the AGC allocation activation signal or an AGC allocation indication, the described techniques can be used to reduce AGC overhead for sidelink communications. In some examples, by transmitting an AGC allocation activation signal for a second AGC allocation to a Tx UE and transmitting a sidelink grant, to the Tx UE, the sidelink grant being for a third AGC allocation for a transport block from the Tx UE to an Rx UE, the described techniques can be used to improve efficiency during sidelink communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (cMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an AGC allocation configuration for a first AGC allocation; and receive one or more of an AGC allocation activation signal or an AGC allocation indication, the AGC allocation activation signal being associated with a second AGC allocation and the AGC allocation indication being associated with a third AGC allocation for a transport block. Additionally, or alternatively, the communication manager 140 may perform one or more other operations described herein. For example, the communication manager 140 may transmit an AGC allocation configuration for a first AGC allocation to an Rx UE; and transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

In some aspects, the network node 110 may include a communication manager 150. As described in more detail elsewhere herein, the communication manager 150 may receive an AGC allocation capability or a preferred AGC allocation; transmit an AGC allocation configuration for a first AGC allocation to a Tx UE, the first AGC allocation being based, at least in part, on the AGC allocation capability or the preferred AGC allocation; transmit an AGC allocation activation signal for a second AGC allocation to the Tx UE; and transmit a sidelink grant, to the Tx UE, the sidelink grant being for a third AGC allocation for a transport block from the Tx UE to an Rx UE. Additionally, or alternatively, the communication manager 150 may perform one or more other operations described herein.

As indicated above, FIG. 1 is provided as an example. Other examples may differ from what is described with regard to FIG. 1.

Figure 2:
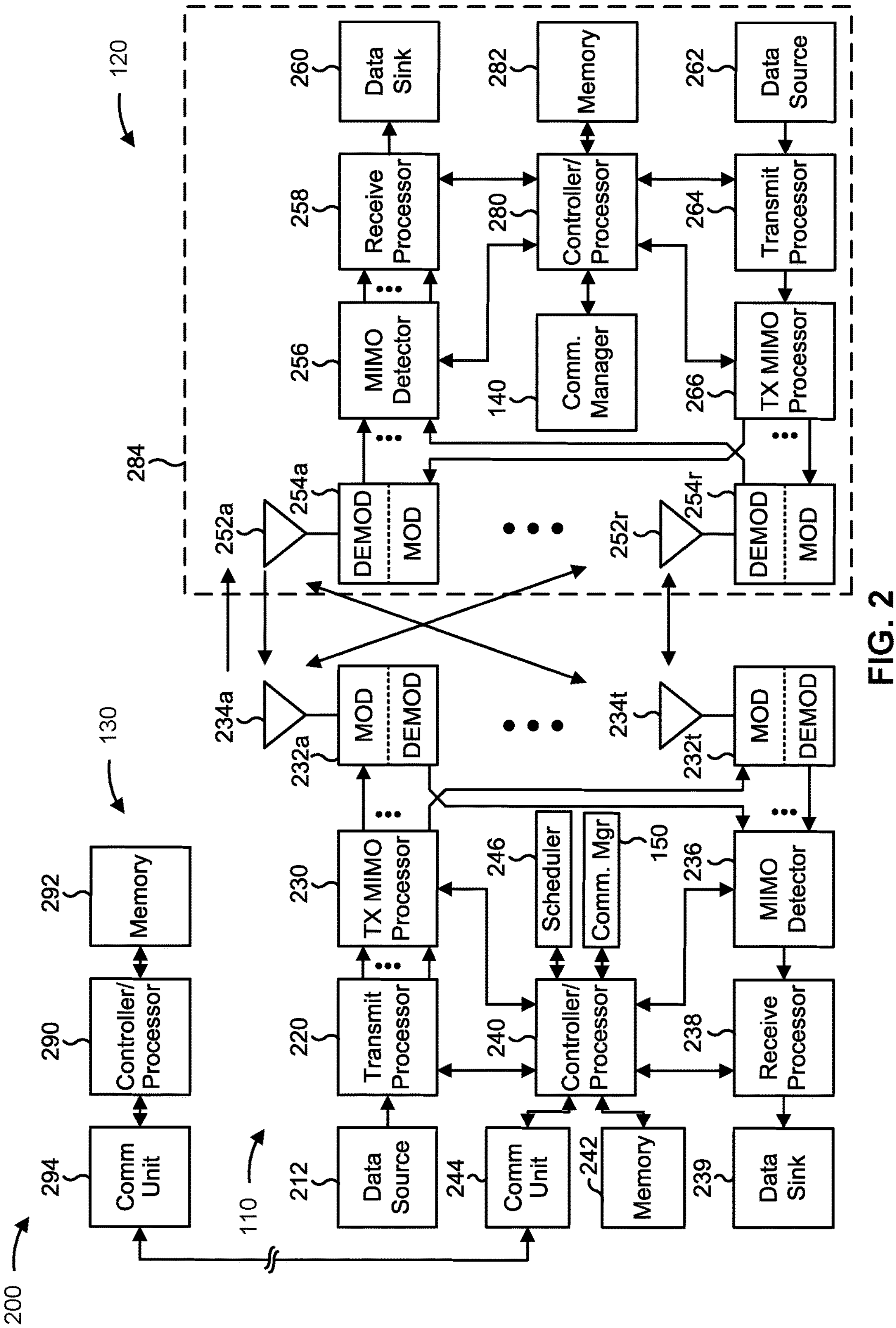
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas ($T \geq 1$). The UE 120 may be equipped with a set of antennas 252*a* through 252*r*, such as R antennas ($R \geq 1$). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with adaptive AGC allocations for sidelink communications, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the Rx UE includes means for receiving an AGC allocation configuration for a first AGC allocation; and/or means for receiving one or more of an AGC allocation activation signal or an AGC allocation indication, the AGC allocation activation signal being associated with a second AGC allocation and the AGC allocation indication being associated with a third AGC allocation for a transport block. The means for the Rx UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the Tx UE includes means for transmitting an AGC allocation configuration for a first AGC allocation to an Rx UE; and/or means for transmitting one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE. The means for the Tx UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an AGC allocation capability or a preferred AGC allocation; means for transmitting an AGC allocation configuration for a first AGC allocation to a Tx UE, the first AGC allocation being based, at least in part, on the AGC allocation capability or the preferred AGC allocation; means for transmitting an AGC allocation activation signal for a second AGC allocation to the Tx UE; and/or means for transmitting a sidelink grant, to the Tx UE, the sidelink grant being for a third AGC allocation for a transport block from the Tx UE to an Rx UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
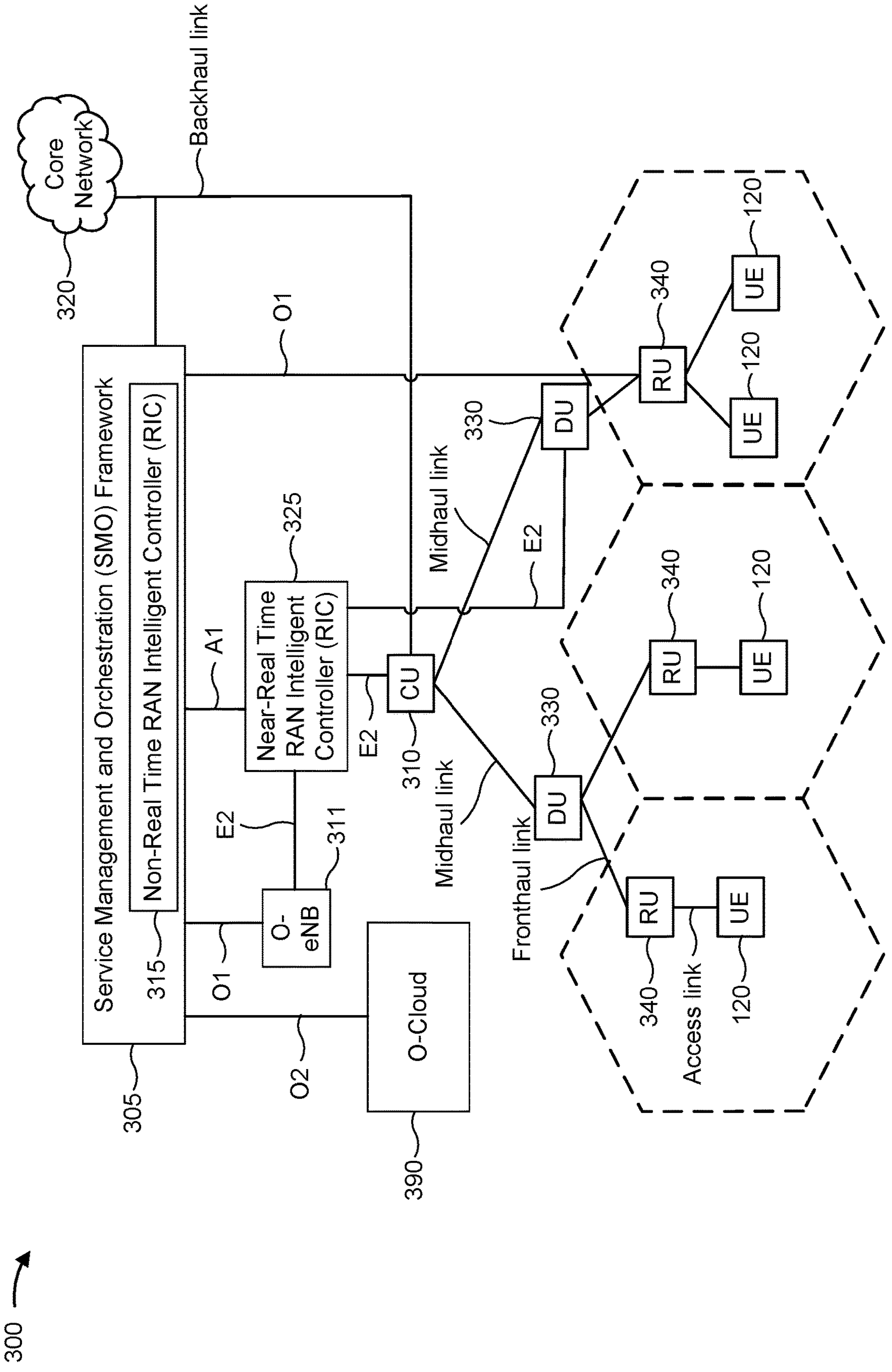
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
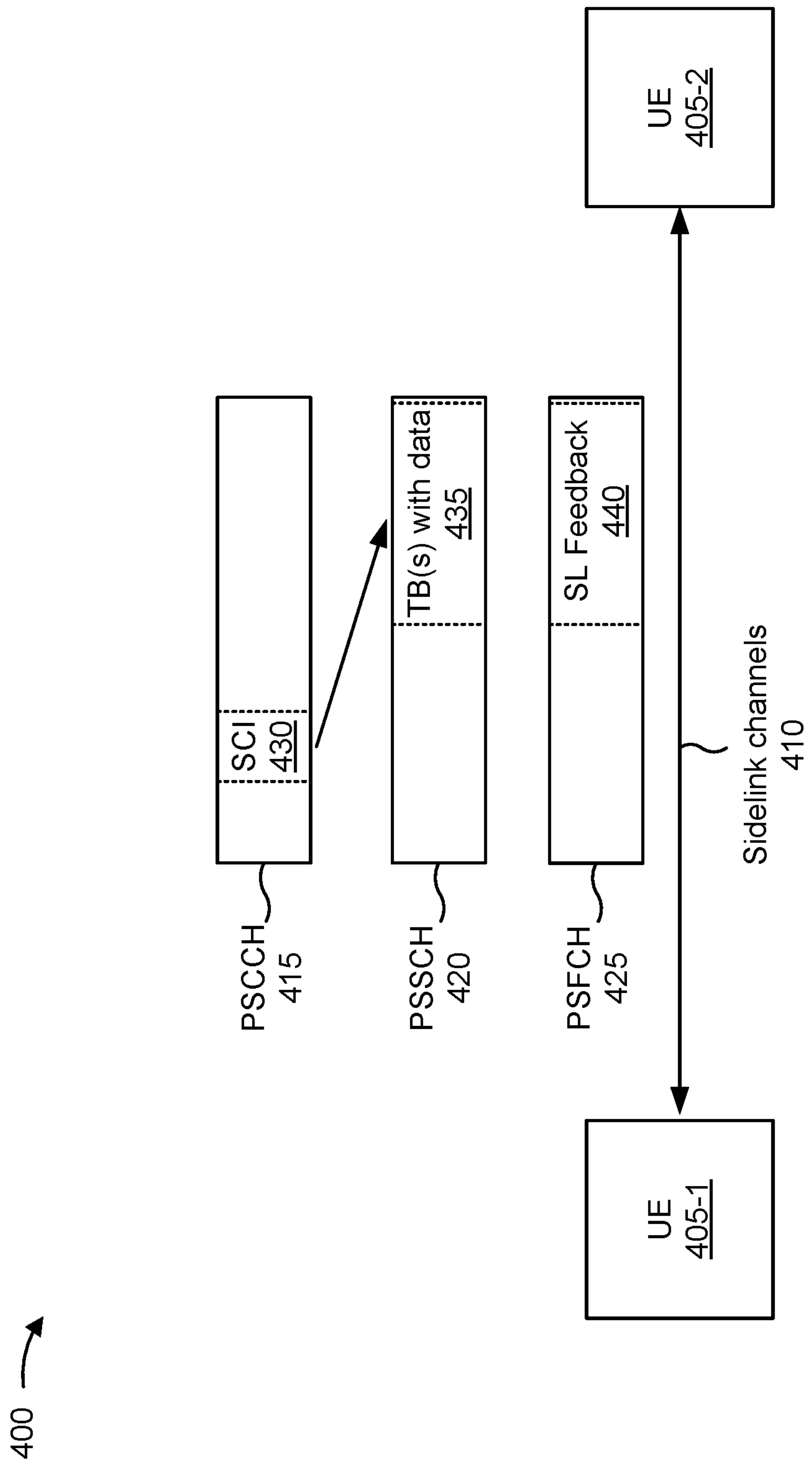
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, a UE 405 may operate using a sidelink resource allocation mode (e.g., Mode 1) where resource selection and/or scheduling is performed by a network node 110 (e.g., a base station, a CU, or a DU). For example, the UE 405 may receive a grant (e.g., in downlink control information (DCI) or in an RRC message, such as for configured grants) from the network node 110 (e.g., directly or via one or more network nodes) for sidelink channel access and/or scheduling. In some aspects, a UE 405 may operate using a resource allocation mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSCCH-RSRP or PSSCH-RSRP parameter) associated with various sidelink channels, and/or may measure an RSRQ parameter (e.g., a PSCCH-RSRQ or PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate reserved resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the resource allocation mode where resource selection and/or scheduling is performed by a UE 405 (Mode 2), the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more slots to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
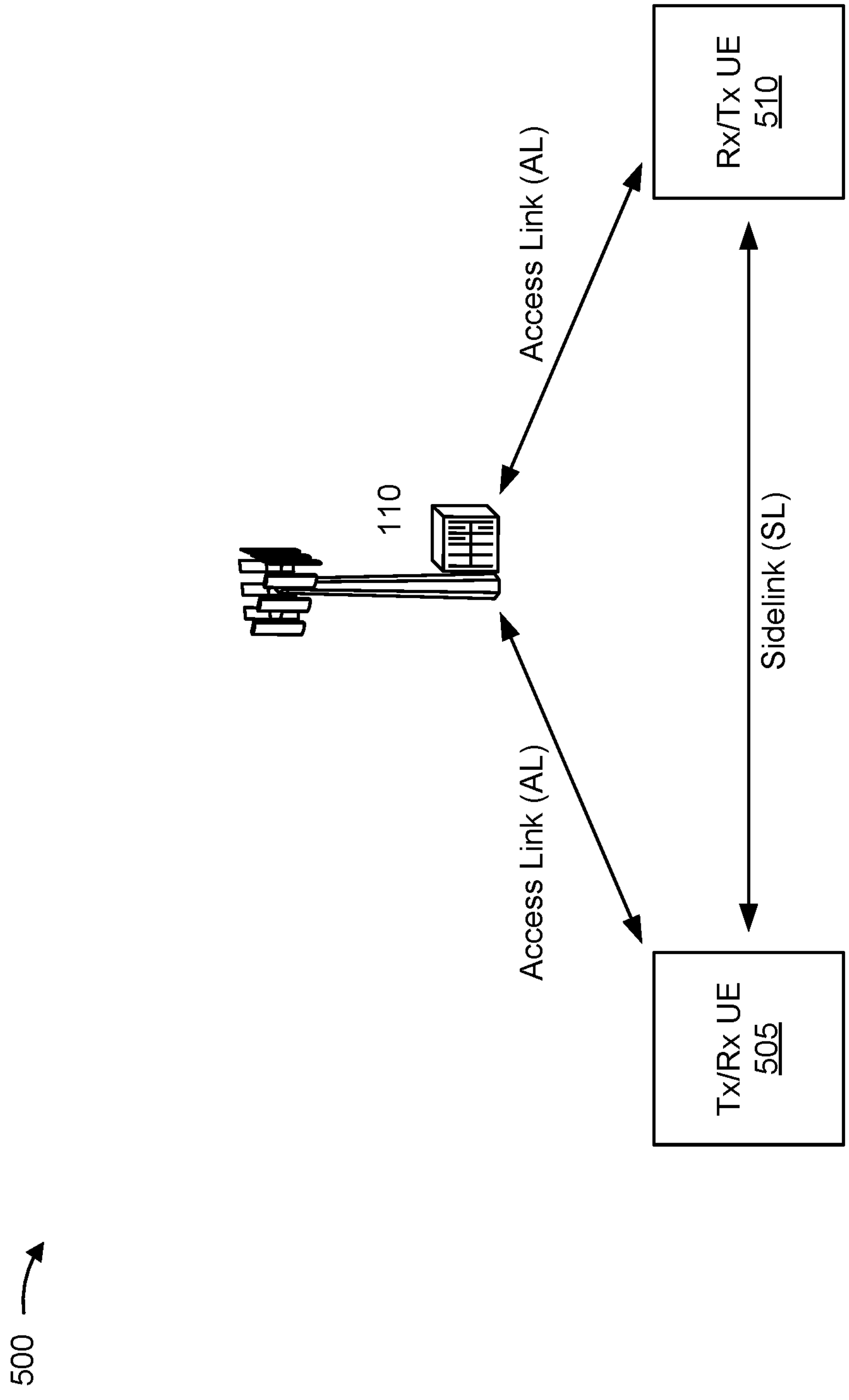
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a Tx/Rx UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

AGC techniques may be applied to sidelink communications between a Tx UE and Rx UE to accommodate variations in signal strength and maintain a consistent signal amplitude by automatically adjusting the gain of the Rx UE in response to changes in signal power. For example, the Rx UE may measure the strength of signals from a transmitter and dynamically modify the AGC based on the measured signal strengths.

As indicated above, FIG. 5 is provided as an example. Other examples may differ from what is described with respect to FIG. 5.

Figure 6:
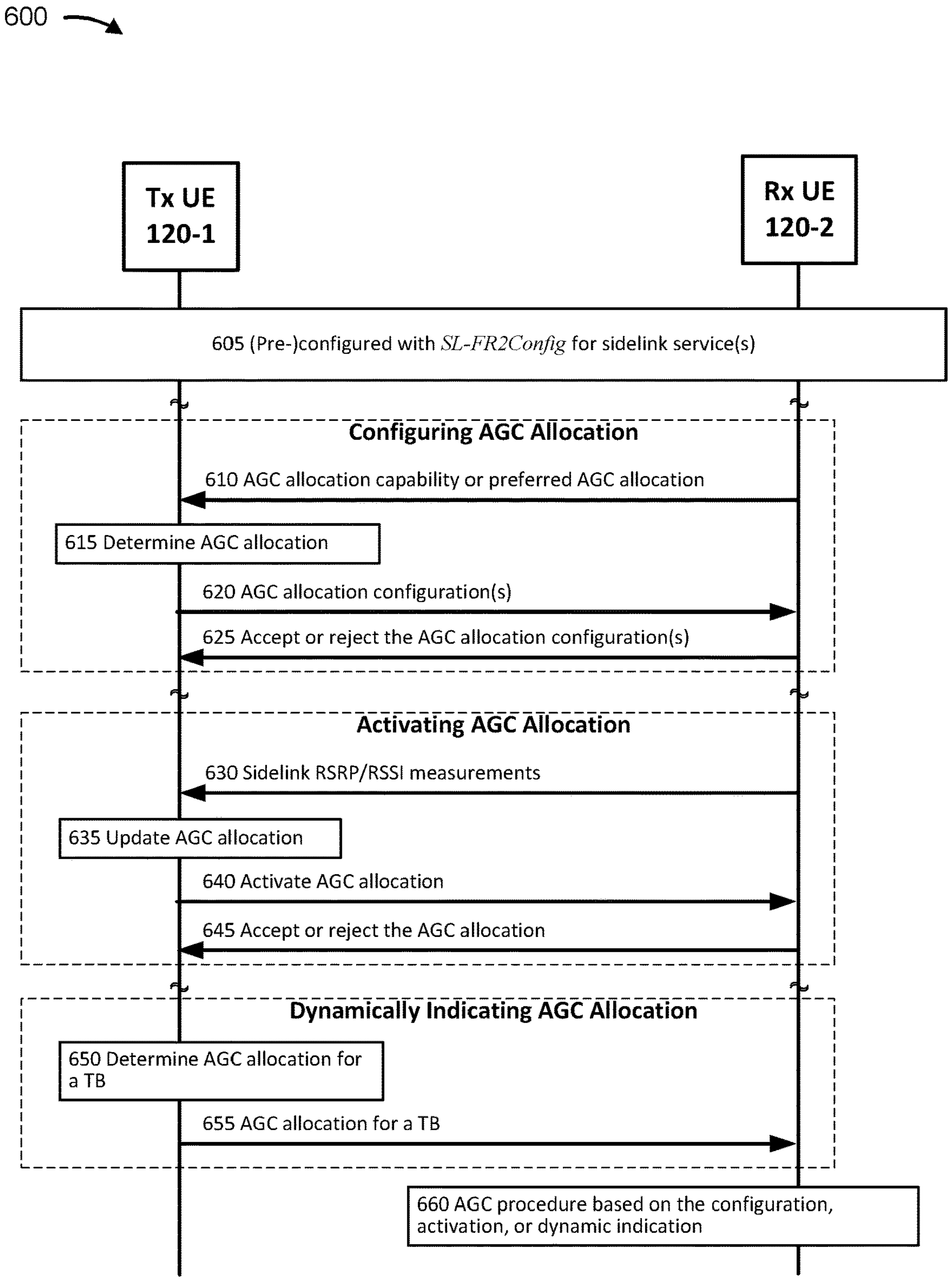
FIG. 6 is a diagram illustrating an example associated with adaptive automatic gain control (AGC) allocations for sidelink communications, in accordance with the present disclosure.

FIG. 6 is a diagram illustrating an example 600 associated with adaptive AGC allocations for sidelink communications, in accordance with the present disclosure. As shown in FIG. 6, a Tx UE 120-1, and an Rx UE 120-2 may communicate with one another. For example, the Tx UE 120-1 and the Rx UE 120-2 may communicate with one another via a sidelink (e.g., PC5) interface.

As shown by reference number 605, the Tx UE 120-1 and the Rx UE 120-2 may be configured or preconfigured with a configuration for sidelink communication. The Tx UE 120-1 and/or the Rx UE 120-2 may receive the configuration for sidelink communication from, for example, one or more network nodes, such as network node 110.

As shown by reference number 610, the Rx UE 120-2 may transmit, and the Tx UE 120-1 may receive, an AGC allocation capability or preferred AGC allocation. The Rx UE 120-2 may transmit the AGC allocation capability (e.g., a minimum or maximum AGC settling time in absolution time or in number of symbols for the numerology of sidelink communication) via a sidelink UE capability message or the preferred AGC allocation configuration via sidelink UE assistance information.

As shown by reference number 615, the TX UE 120-1 may determine a first AGC allocation. The Tx UE 120-1 may determine the AGC allocation (e.g., the number of AGC symbols within a slot structure associated with the numerology or subcarrier spacing of a sidelink communication) based on the received AGC allocation capability or the preferred AGC allocation configuration.

As shown by reference number 620, the Tx UE 120-1 may transmit, and the Rx UE 120-2 may receive, the determined AGC allocation configuration. The Tx UE 120-1 may transmit the determined AGC allocation configuration via a PC5 RRC configuration message.

As shown by reference number 625, the Rx UE 120-2 may transmit, and the Tx UE 120-1 may receive, an indication accepting or rejecting the first AGC allocation. If the first AGC allocation is rejected, the Tx UE 120-2 may determine a different AGC allocation configuration. If the first AGC allocation is accepted, the Tx UE 120-1 and the Rx UE 120-2 may proceed to communicate in accordance with the first AGC allocation or possibly in accordance with a second AGC allocation or a third AGC allocation, as discussed in greater detail below.

As shown by reference number 630, the Rx UE 120-2 may transmit, and the Tx UE 120-1 may receive, sidelink signal measurement report. In some aspects, the signal measurement report may include, for example, measurements of sidelink RSRP (e.g., PSCCH-RSRP or PSSCH-RSRP) or sidelink RSSI or the variances associated with one or more of a sidelink RSRP or a sidelink RSSI (e.g., the maximum or the minimum or averaged variance).

As shown by reference number 635, the Tx UE 120-1 may update the first AGC allocation to, for example, the second AGC allocation based on the received sidelink RSRP or RSSI measurements reported from Rx UE 120-2 and/or transmit power adjustments (e.g., the maximum or minimum or averaged variance of transmit power adjustment for a sidelink communication) by the Tx UE 120-1. An AGC allocation configuration for the second AGC allocation with, for example, fewer or no AGC symbols may be activated, if the variance of sidelink RSRP or RSSI measurement (e.g., maximum variance or averaged variance within a configured time interval) is below a configured or preconfigured threshold. Alternatively or in addition, the AGC allocation configuration for the second AGC allocation may be activated if the adjustment of sidelink transmit power is below a threshold (e.g., maximum adjustment or averaged adjustment within a configured time interval) is below a configured or preconfigured threshold. Alternatively or in addition, the AGC allocation configuration for the second AGC allocation may be based, at least in part, on any combination of sidelink measurements and/or transmit power adjustments, among other examples.

As shown by reference number 640, the Tx UE 120-1 may transmit, and the Rx UE 120-2 may receive, an AGC allocation activation signal. In some aspects, the AGC allocation activation signal may be used to activate the second AGC allocation. The Tx UE 120-1 may transmit the AGC allocation activation signal via a PC5 RRC or MAC control element (MAC-CE) messaging. In some aspects, the activation may activate or deactivate one of the AGC allocations (pre-) configured, for example, with the indication of activating or deactivating an AGC allocation index or code point of AGC allocation configuration. In some aspects, the activation may activate a new AGC allocation, for example, with the indication of activating a new AGC allocation with the AGC settling time or AGC symbols.

As shown by reference number 645, the Rx UE 120-2 may transmit, and the Tx UE 120-1 may receive, an indication accepting or rejecting the second AGC allocation. If the second AGC allocation is rejected, the Tx UE 120-2 may determine a different AGC allocation configuration or continue using the current AGC allocation. If the second AGC allocation is accepted, the Tx UE 120-1 and the Rx UE 120-2 may proceed to communicate in accordance with the second AGC allocation or possibly in accordance with a third AGC allocation, as discussed in greater detail below.

As shown by reference number 650, the Tx UE 120-1 may determine a third AGC allocation for a transport block. For example, the Tx UE 120-1 may determine the third AGC allocation for transmission or retransmission of a transport block, based, for instance, on the quality of service (e.g., error rate, data rate, priority, and/or a combination thereof, among other examples), MCS, or peak-to-average power ratio (PAPR), and/or a combination thereof, among other examples, of the transport block.

As shown by reference number 655, the Tx UE 120-1 may transmit, and the Rx UE 120-2 may receive, an AGC allocation indication associated with the third AGC allocation for a transport block. For example, the Tx UE 120-1 may transmit the AGC allocation indication to indicate the third AGC allocation in sidelink control information or MAC-CE messaging (e.g., with or without the initial transmission of the transport block). For example, the Tx UE 120-1 may transmit an AGC allocation indication to indicate the third AGC allocation in SCI-2 or MAC-CE messaging with the initial transmission of a transport block (e.g., fewer or no AGC symbol for following retransmissions). For another example, the Tx UE 120-1 may transmit an AGC allocation indication to indicate the third AGC allocation in SCI-2 or MAC-CE messaging without the initial transmission of a transport block (e.g., a new AGC allocation to be used for both initial transmission and the following retransmissions). In some aspects, the AGC allocation indication may indicate the third AGC allocation with fewer or no AGC symbols (relative to the first AGC allocation or the second AGC allocation) to address a high error rate, a low data rate, or a low priority communication. In some aspect, the third AGC allocation may have fewer or no AGC symbols (relative to the first AGC allocation or the second AGC allocation) to address a low MCS or low PAPR.

As shown by reference number 660, the Rx UE 120-2 may apply the AGC procedure based on the AGC allocation configuration, the AGC allocation activation signal, or the AGC allocation indication.

As indicated above, FIG. 6 is provided as an example. Other examples may differ from what is described with respect to FIG. 6.

Figure 7:
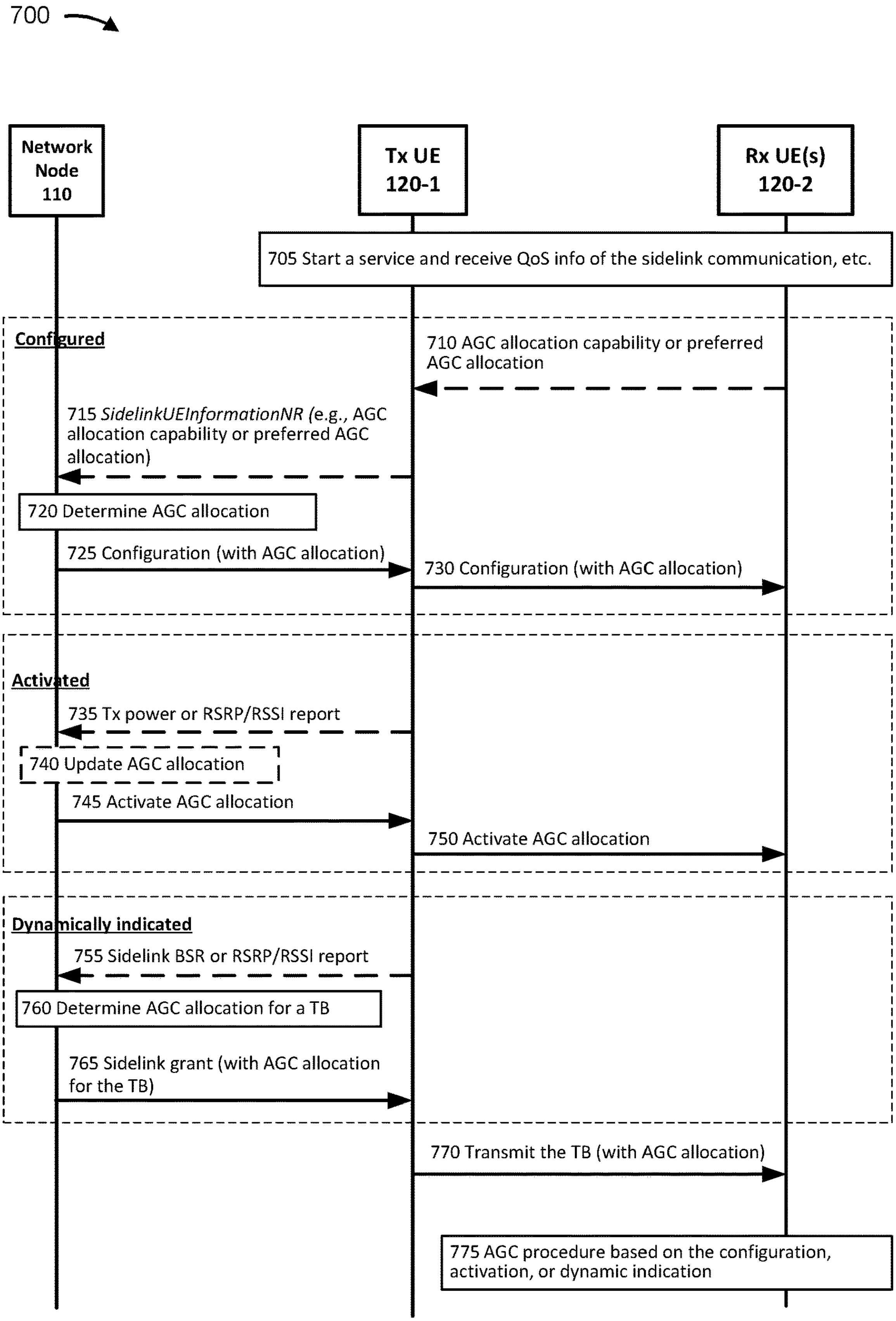
FIG. 7 is a diagram illustrating an example associated with adaptive AGC allocations for sidelink communications, in accordance with the present disclosure.

FIG. 7 is a diagram illustrating an example 700 associated with adaptive AGC allocations for sidelink communications, in accordance with the present disclosure. As shown in FIG. 7, a network node 110, a Tx UE 120-1, and an Rx UE 120-2 may communicate with one another. For example, the network node 110 and the Tx UE 120-1 may communicate with one another via a Uu interface, and the Tx UE 120-1 and the Rx UE 120-2 may communicate with one another via a sidelink (e.g., PC5) interface.

As shown by reference number 705, the Tx UE 120-1 and the Rx UE 120-2 may be configured or preconfigured with a configuration for sidelink communication and communicate with one another via sidelink. In some aspects, the Tx UE 120-1 and the Rx UE 120-2 may exchange quality-of-service information associated with the sidelink communications.

As shown by reference number 710, the Rx UE 120-2 may transmit, and the Tx UE 120-1 may receive, an AGC allocation capability or preferred AGC allocation. The Rx UE 120-2 may transmit the AGC allocation capability (e.g., a minimum or maximum AGC settling time) via a sidelink UE capability message or the preferred AGC allocation configuration via sidelink UE assistance information.

As shown by reference number 715, the Tx UE 120-1 may transmit, and the network node 110 may receive, the AGC allocation capability or preferred AGC allocation. The Tx UE 120-1 may indicate to the network node 110 the AGC allocation capability or preferred AGC allocation (including the received AGC allocation capability or preferred AGC allocation configuration from the Rx UE 120-2), via a sidelink UE information message.

As shown by reference number 720, the network node 110 may determine a first AGC allocation. The network node 110 may determine the first AGC allocation (e.g., the number of AGC symbols within a slot structure with the numerology or subcarrier spacing of a sidelink communication) based on the received AGC allocation capability or the preferred AGC allocation configuration.

As shown by reference number 725, the network node 110 may transmit, and the Tx UE 120-1 may receive, the determined AGC allocation configuration. The network node 110 may transmit the determined AGC allocation configuration via an RRC reconfiguration message.

As shown by reference number 730, the Tx UE 120-1 may forward, and the Rx UE 120-2 may receive, the determined AGC allocation configuration. The Tx UE 120-1 may forward the determined AGC allocation configuration via a PC5 RRC configuration message.

As shown by reference number 735, the Tx UE 120-1 may transmit, and the network node 110 may receive, a signal measurement report including sidelink transmit power adjustments or the maximum or minimum or averaged variance of the sidelink transmit power adjustments or sidelink measurements such as sidelink RRSI or sidelink RSRP or sidelink RSRQ or the maximum or minimum or averaged variance of the sidelink measurements based on communications between the Tx UE 120-1 and the Rx UE 120-2. In some aspects, the signal measurement report may include, for example, measurements or variances associated with one or more of an RSRP or an RSRQ or an RSSI associated with sidelink communications between the Tx UE 120-1 and the Rx UE 120-2.

As shown by reference number 740, the network node 110 may update the first AGC allocation to, for example, the second AGC allocation based on the transmit power, the sidelink RSRP, or the sidelink RSSI measurements reported from the Tx UE 120-1. An AGC allocation configuration for the second AGC allocation with, for example, fewer or no AGC symbols may be activated, if the variance of sidelink RSRP or RSSI measurement (e.g., maximum variance or averaged variance within a configured time interval) is below a configured or preconfigured threshold. Alternatively or in addition, the AGC allocation configuration for the second AGC allocation may be activated if the adjustment of sidelink transmit power or the maximum or averaged variance of sidelink transmit power adjustments is below a threshold (e.g., maximum adjustment or averaged adjustment within a configured time interval) is below a configured or preconfigured threshold.

As shown by reference number 745, the network node 110 may transmit, and the Tx UE 120-1 may receive, an AGC allocation activation signal. In some aspects, the AGC allocation activation signal may be used to update the first AGC allocation to the second AGC allocation or to update multiple AGC allocation configurations. The network node 110 may transmit the AGC allocation activation signal via, for example, MAC-CE messaging.

As shown by reference number 750, the Tx UE 120-1 may forward, and the Rx UE 120-2 may receive, the AGC allocation activation signal. In some aspects, the AGC allocation activation signal may be used to activate the second AGC allocation for communications between the Tx UE 120-1 and the Rx UE 120-2. The Tx UE 120-1 may forward the AGC allocation activation signal via a PC5 RRC or MAC-CE messaging.

As shown by reference number 755, the Tx UE 120-1 may transmit, and the network node 110 may receive, a sidelink buffer status report. The sidelink buffer status report may include, for example, a quality of service (e.g., error rate, data rate, priority, and/or a combination thereof, among other examples) of a logical channel group associated with a destination ID.

As shown by reference number 760, the network node 110 may determine a third AGC allocation for a transport block. The third AGC allocation may include a sidelink grant based, at least in part, on the sidelink buffer status report. In some aspects, the network node 110 may determine the third AGC allocation for initial transmission and/or retransmission of a transport block, based, for instance, on the quality of service (e.g., error rate, data rate, priority, and/or a combination thereof, among other examples).

As shown by reference number 765, the network node 110 may transmit, and the Tx UE 120-1 may receive, a sidelink grant with the third AGC allocation. In some aspects, the network node 110 may indicate the sidelink grant of a transport block with the determined third AGC allocation via DCI.

As shown by reference number 770, the Tx UE 120-1 may transmit, and the Rx UE 120-2 may receive, an AGC allocation indication associated with the third AGC allocation for the transport block. For example, the Tx UE 120-1 may transmit the AGC allocation indication to indicate the third AGC allocation in sidelink control information or MAC-CE messaging (e.g., with or without the initial transmission of the transport block). In some aspects, the AGC allocation indication may indicate the third AGC allocation with fewer or no AGC symbols (relative to the first AGC allocation or the second AGC allocation) to address a high error rate, a low data rate, or a low priority communication. In some aspect, the third AGC allocation may have fewer or no AGC symbols (relative to the first AGC allocation or the second AGC allocation) to address a low MCS or low PAPR.

As shown by reference number 775, the Rx UE 120-2 may apply the AGC procedure based on the AGC allocation configuration, the AGC allocation activation signal, or the AGC allocation indication.

As indicated above, FIG. 7 is provided as an example. Other examples may differ from what is described with respect to FIG. 7.

Figure 8:
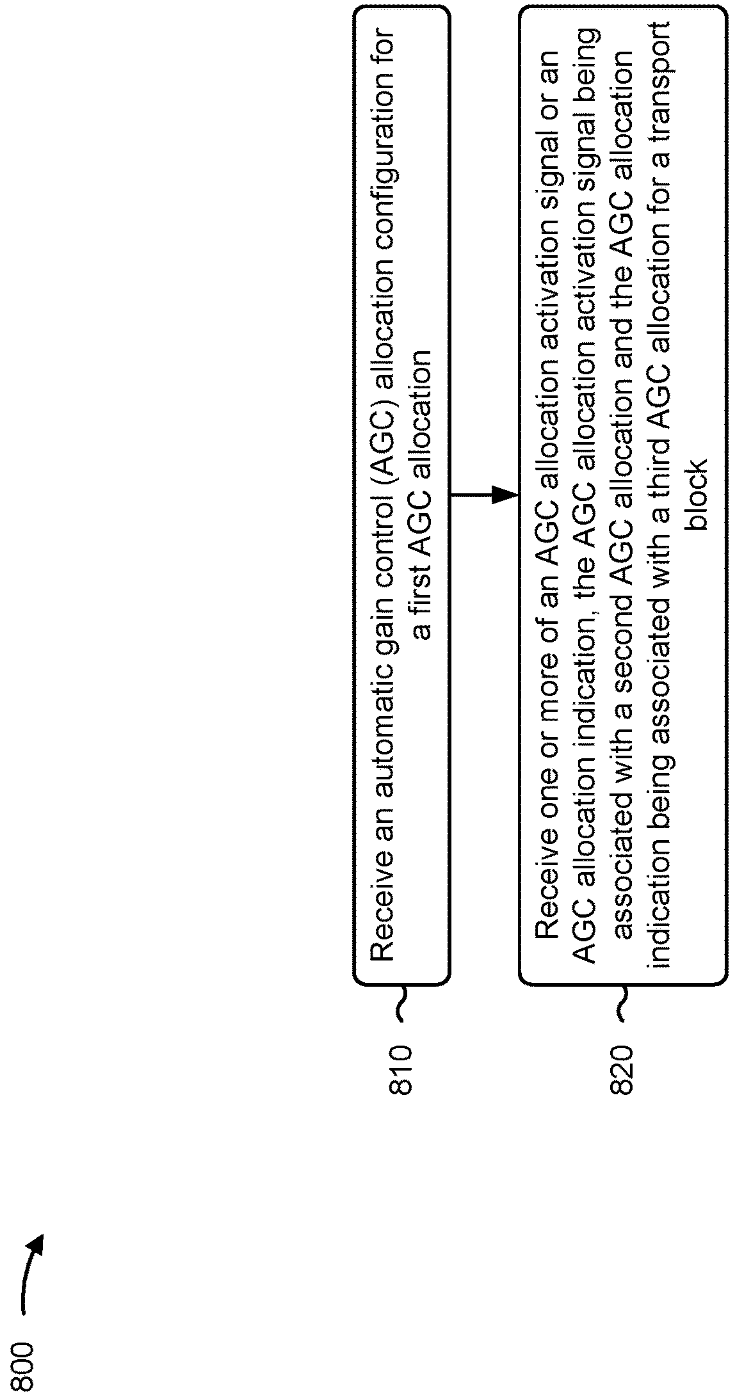
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., Rx UE 120-2) performs operations associated with adaptive AGC allocations for sidelink communications.

As shown in FIG. 8, in some aspects, process 800 may include receiving an AGC allocation configuration for a first AGC allocation (block 810). For example, the UE (e.g., using reception component 1102 and/or communication manager 1106, depicted in FIG. 11) may receive an AGC allocation configuration for a first AGC allocation, as described above.

As further shown in FIG. 8, in some aspects, process 800 may include receiving one or more of an AGC allocation activation signal or an AGC allocation indication, the AGC allocation activation signal being associated with a second AGC allocation and the AGC allocation indication being associated with a third AGC allocation for a transport block (block 820). For example, the UE (e.g., using reception component 1102 and/or communication manager 1106, depicted in FIG. 11) may receive one or more of an AGC allocation activation signal or an AGC allocation indication, the AGC allocation activation signal being associated with a second AGC allocation and the AGC allocation indication being associated with a third AGC allocation for a transport block, as described above.

Process 800 may include additional aspects, such as any single aspect or any combination of aspects described below and/or in connection with one or more other processes described elsewhere herein.

In a first aspect, process 800 includes transmitting an AGC allocation capability or a preferred AGC allocation.

In a second aspect, alone or in combination with the first aspect, the AGC allocation capability or the preferred AGC allocation is transmitted via a sidelink interface.

In a third aspect, alone or in combination with one or more of the first and second aspects, the AGC allocation capability or the preferred AGC allocation is based, at least in part, on a minimum or maximum AGC settling time.

In a fourth aspect, alone or in combination with one or more of the first through third aspects, process 800 includes transmitting an indication accepting or rejecting the AGC configuration for the first AGC allocation.

In a fifth aspect, alone or in combination with one or more of the first through fourth aspects, the indication accepting or rejecting the AGC configuration for the first AGC allocation is transmitted via a sidelink interface.

In a sixth aspect, alone or in combination with one or more of the first through fifth aspects, process 800 includes transmitting a signal measurement report.

In a seventh aspect, alone or in combination with one or more of the first through sixth aspects, the signal measurement report includes one or more of a reference signal received power or a received signal strength indicator.

In an eighth aspect, alone or in combination with one or more of the first through seventh aspects, the AGC allocation configuration for the first AGC allocation is received via a sidelink interface.

In a ninth aspect, alone or in combination with one or more of the first through eighth aspects, the third AGC allocation is received with the transport block.

In a tenth aspect, alone or in combination with one or more of the first through ninth aspects, the third AGC allocation is received separately from the transport block.

In an eleventh aspect, alone or in combination with one or more of the first through tenth aspects, the second AGC allocation includes a different number of AGC symbols than the first AGC allocation.

In a twelfth aspect, alone or in combination with one or more of the first through eleventh aspects, process 800 includes performing an AGC procedure based, at least in part, on one of the first AGC allocation, the second AGC allocation, or the third AGC allocation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
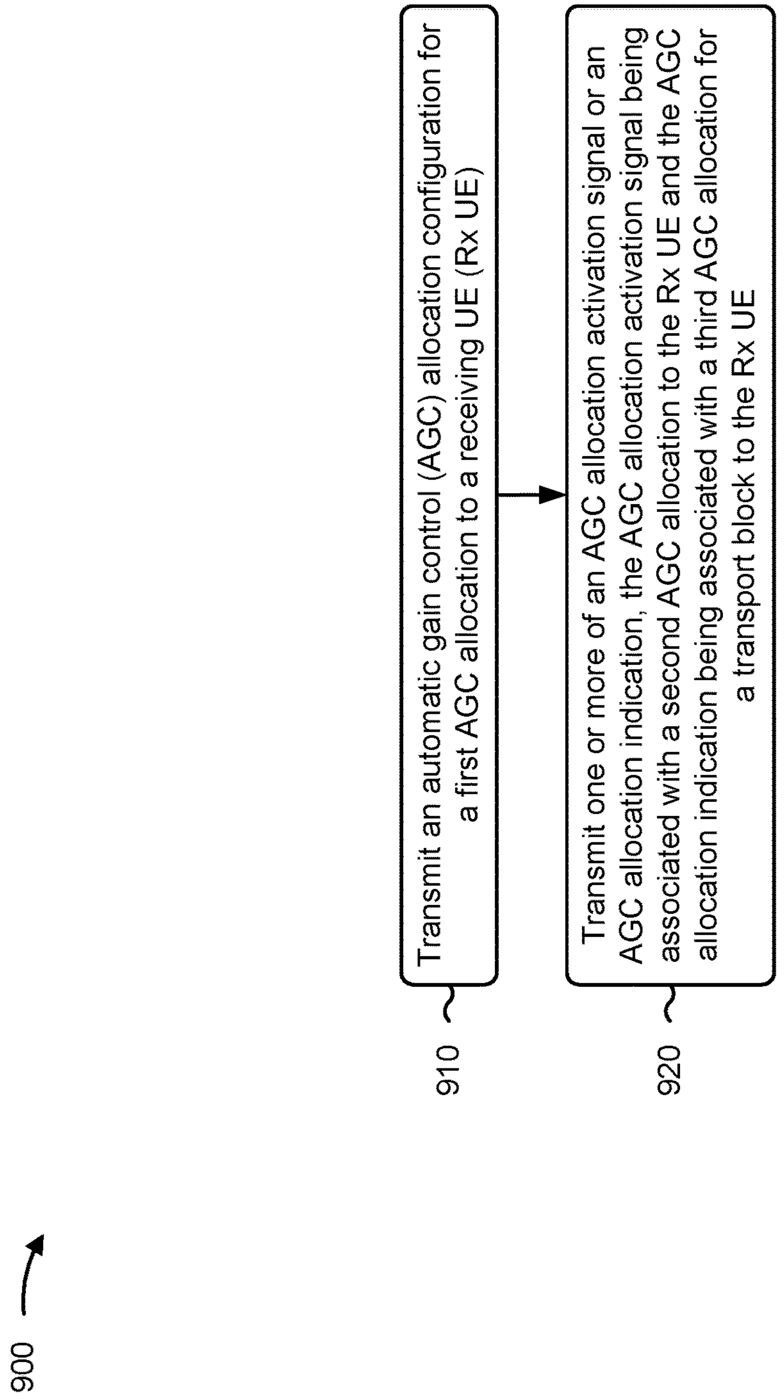
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., Tx UE 120-1) performs operations associated with adaptive AGC allocations for sidelink communication.

As shown in FIG. 9, in some aspects, process 900 may include transmitting an AGC allocation configuration for a first AGC allocation to an Rx UE (block 910). For example, the UE (e.g., using transmission component 1104 and/or communication manager 1106, depicted in FIG. 11) may transmit an AGC allocation configuration for a first AGC allocation to an Rx UE, as described above.

As further shown in FIG. 9, in some aspects, process 900 may include transmitting one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE (block 920). For example, the UE (e.g., using transmission component 1104 and/or communication manager 1106, depicted in FIG. 11) may transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE, as described above.

Process 900 may include additional aspects, such as any single aspect or any combination of aspects described below and/or in connection with one or more other processes described elsewhere herein.

In a first aspect, process 900 includes receiving the AGC allocation configuration from a network node before transmitting the AGC allocation configuration to the Rx UE.

In a second aspect, alone or in combination with the first aspect, process 900 includes receiving an AGC allocation capability or a preferred AGC allocation from the Rx UE.

In a third aspect, alone or in combination with one or more of the first and second aspects, process 900 includes transmitting the AGC allocation capability or the preferred AGC allocation to a network node.

In a fourth aspect, alone or in combination with one or more of the first through third aspects, the AGC allocation capability or the preferred AGC allocation is received via a sidelink interface.

In a fifth aspect, alone or in combination with one or more of the first through fourth aspects, the AGC allocation capability or the preferred AGC allocation is based, at least in part, on a minimum or maximum AGC settling time.

In a sixth aspect, alone or in combination with one or more of the first through fifth aspects, process 900 includes receiving an indication accepting or rejecting the AGC allocation configuration for the first AGC allocation from the Rx UE.

In a seventh aspect, alone or in combination with one or more of the first through sixth aspects, the indication accepting or rejecting the AGC allocation configuration for the first AGC allocation is transmitted via a sidelink interface.

In an eighth aspect, alone or in combination with one or more of the first through seventh aspects, process 900 includes receiving a signal measurement report from the Rx UE.

In a ninth aspect, alone or in combination with one or more of the first through eighth aspects, process 900 includes updating the first AGC allocation based, at least in part, on the signal measurement report or a transmit power adjustment.

In a tenth aspect, alone or in combination with one or more of the first through ninth aspects, the signal measurement report includes one or more of a reference signal received power or a received signal strength indicator.

In an eleventh aspect, alone or in combination with one or more of the first through tenth aspects, the AGC allocation configuration for the first AGC allocation is transmitted via a sidelink interface.

In a twelfth aspect, alone or in combination with one or more of the first through eleventh aspects, the third AGC allocation is transmitted with the transport block.

In a thirteenth aspect, alone or in combination with one or more of the first through twelfth aspects, the third AGC allocation is transmitted separately from the transport block.

In a fourteenth aspect, alone or in combination with one or more of the first through thirteenth aspects, the second AGC allocation includes a different number of AGC symbols than the first AGC allocation.

In a fifteenth aspect, alone or in combination with one or more of the first through fourteenth aspects, process 900 includes determining the first AGC allocation based, at least in part, on the AGC allocation capability or the preferred AGC allocation.

In a sixteenth aspect, alone or in combination with one or more of the first through fifteenth aspects, process 900 includes determining the second AGC allocation based, at least in part, on one or more signal measurement reports.

In a seventeenth aspect, alone or in combination with one or more of the first through sixteenth aspects, process 900 includes determining the third AGC allocation based, at least in part, on one or more of a quality of service, a modulation coding scheme, or a peak-to-average power ratio associated with the transport block.

In an eighteenth aspect, alone or in combination with one or more of the first through seventeenth aspects, process 900 includes receiving the AGC allocation activation signal for the second AGC allocation from a network node.

In a nineteenth aspect, alone or in combination with one or more of the first through eighteenth aspects, process 900 includes receiving a sidelink grant for the third AGC allocation from a network node.

In a twentieth aspect, alone or in combination with one or more of the first through nineteenth aspects, the sidelink grant for the third AGC allocation is received from the network node via downlink control information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
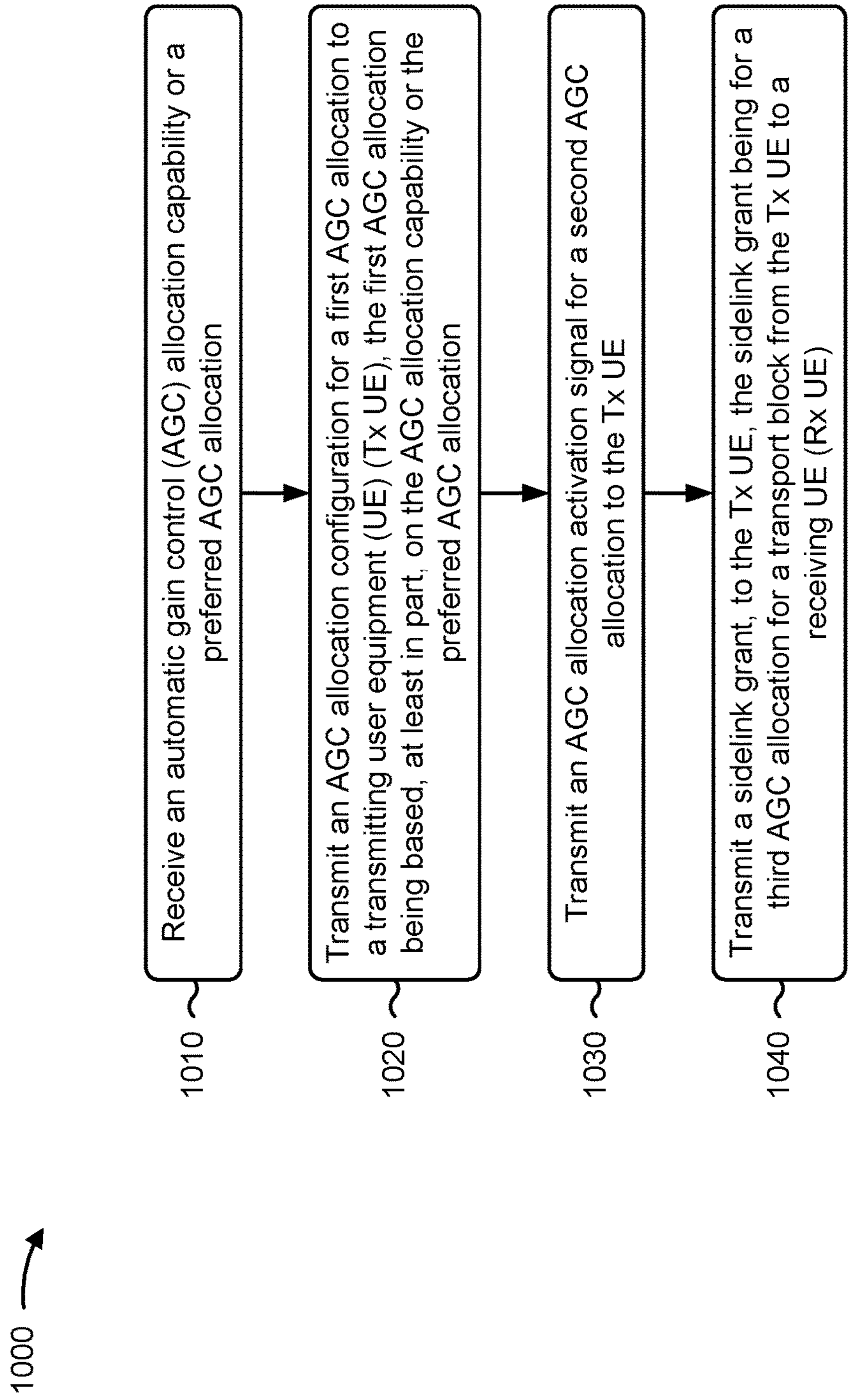
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with adaptive AGC allocations for UEs 120 engaging in sidelink communications.

As shown in FIG. 10, in some aspects, process 1000 may include receiving an AGC allocation capability or a preferred AGC allocation (block 1010). For example, the network node (e.g., using reception component 1202 and/or communication manager 1206, depicted in FIG. 12) may receive an AGC allocation capability or a preferred AGC allocation, as described above.

As further shown in FIG. 10, in some aspects, process 1000 may include transmitting an AGC allocation configuration for a first AGC allocation to a Tx UE, the first AGC allocation being based, at least in part, on the AGC allocation capability or the preferred AGC allocation (block 1020). For example, the network node (e.g., using transmission component 1204 and/or communication manager 1206, depicted in FIG. 12) may transmit an AGC allocation configuration for a first AGC allocation to a Tx UE, the first AGC allocation being based, at least in part, on the AGC allocation capability or the preferred AGC allocation, as described above.

As further shown in FIG. 10, in some aspects, process 1000 may include transmitting an AGC allocation activation signal for a second AGC allocation to the Tx UE (block 1030). For example, the network node (e.g., using transmission component 1204 and/or communication manager 1206, depicted in FIG. 12) may transmit an AGC allocation activation signal for a second AGC allocation to the Tx UE, as described above.

As further shown in FIG. 10, in some aspects, process 1000 may include transmitting a sidelink grant, to the Tx UE, the sidelink grant being for a third AGC allocation for a transport block from the Tx UE to an Rx UE (block 1040). For example, the network node (e.g., using transmission component 1204 and/or communication manager 1206, depicted in FIG. 12) may transmit a sidelink grant, to the Tx UE, the sidelink grant being for a third AGC allocation for a transport block from the Tx UE to an Rx UE, as described above.

Process 1000 may include additional aspects, such as any single aspect or any combination of aspects described below and/or in connection with one or more other processes described elsewhere herein.

In a first aspect, the AGC allocation capability or the preferred AGC allocation is received via sidelink information.

In a second aspect, alone or in combination with the first aspect, the AGC allocation capability or the preferred AGC allocation is based, at least in part, on a minimum or maximum AGC settling time.

In a third aspect, alone or in combination with one or more of the first and second aspects, a signal measurement report is based, at least in part, on communications between the Rx UE and the Tx UE.

In a fourth aspect, alone or in combination with one or more of the first through third aspects, process 1000 includes receiving the second AGC allocation based, at least in part, on the signal measurement report or a transmit power adjustment.

In a fifth aspect, alone or in combination with one or more of the first through fourth aspects, the signal measurement report includes one or more of a reference signal received power or a received signal strength indicator.

In a sixth aspect, alone or in combination with one or more of the first through fifth aspects, the AGC allocation configuration for the first AGC allocation is transmitted to the Tx UE via a radio resource control signal.

In a seventh aspect, alone or in combination with one or more of the first through sixth aspects, the sidelink grant indicates the Tx UE to transmit the third AGC allocation with the transport block.

In an eighth aspect, alone or in combination with one or more of the first through seventh aspects, the sidelink grant indicates the Tx UE to transmit the third AGC allocation separately from the transport block.

In a ninth aspect, alone or in combination with one or more of the first through eighth aspects, the first AGC allocation is based, at least in part, on the AGC allocation capability or the preferred AGC allocation.

In a tenth aspect, alone or in combination with one or more of the first through ninth aspects, process 1000 includes determining the third AGC allocation based, at least in part, on one or more of a sidelink buffer status report or a quality of service associated with a destination identifier of a logical channel group.

In an eleventh aspect, alone or in combination with one or more of the first through tenth aspects, process 1000 includes transmitting the AGC allocation activation signal to the Tx UE via MAC-CE signaling.

In a twelfth aspect, alone or in combination with one or more of the first through eleventh aspects, process 1000 includes transmitting the sidelink grant for the third AGC allocation is transmitted via downlink control information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
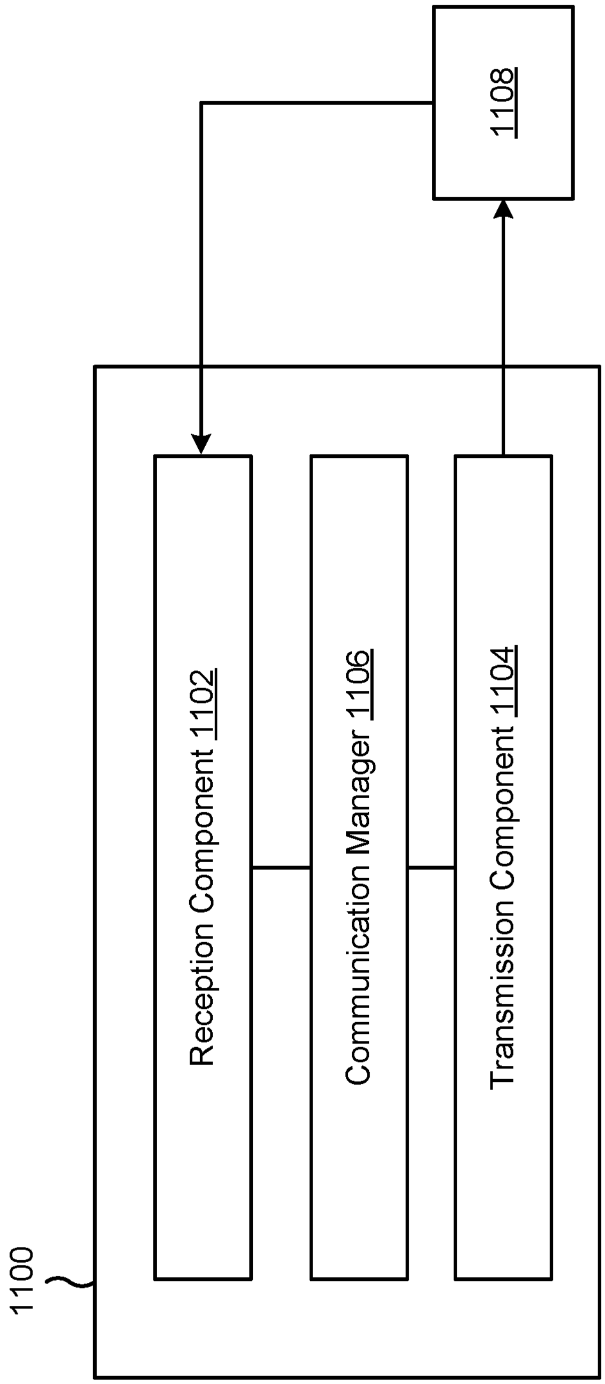
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (such as a Tx UE or an Rx UE), or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive an AGC allocation configuration for a first AGC allocation. The reception component 1102 may receive one or more of an AGC allocation activation signal or an AGC allocation indication, the AGC allocation activation signal being associated with a second AGC allocation and the AGC allocation indication being associated with a third AGC allocation for a transport block.

The transmission component 1104 may transmit an AGC allocation capability or a preferred AGC allocation. The transmission component 1104 may transmit an indication accepting or rejecting the AGC configuration for the first AGC allocation. The transmission component 1104 may transmit a signal measurement report.

The communication manager 1106 may perform an AGC procedure based, at least in part, on one of the first AGC allocation, the second AGC allocation, or the third AGC allocation.

The transmission component 1104 may transmit an AGC allocation configuration for a first AGC allocation to an Rx UE. The transmission component 1104 may transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

The reception component 1102 may receive the AGC allocation configuration from a network node before transmitting the AGC allocation configuration to the Rx UE. The reception component 1102 may receive an AGC allocation capability or a preferred AGC allocation from the Rx UE.

The transmission component 1104 may transmit the AGC allocation capability or the preferred AGC allocation to a network node.

The reception component 1102 may receive an indication accepting or rejecting the AGC allocation configuration for the first AGC allocation from the Rx UE. The reception component 1102 may receive a signal measurement report from the Rx UE.

The communication manager 1106 may update the first AGC allocation based, at least in part, on the signal measurement report or a transmit power adjustment. The communication manager 1106 may determine the first AGC allocation based, at least in part, on the AGC allocation capability or the preferred AGC allocation. The communication manager 1106 may determine the second AGC allocation based, at least in part, on one or more signal measurement reports. The communication manager 1106 may determine the third AGC allocation based, at least in part, on one or more of a quality of service, a modulation coding scheme, or a peak-to-average power ratio associated with the transport block.

The reception component 1102 may receive the AGC allocation activation signal for the second AGC allocation from a network node. The reception component 1102 may receive a sidelink grant for the third AGC allocation from a network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
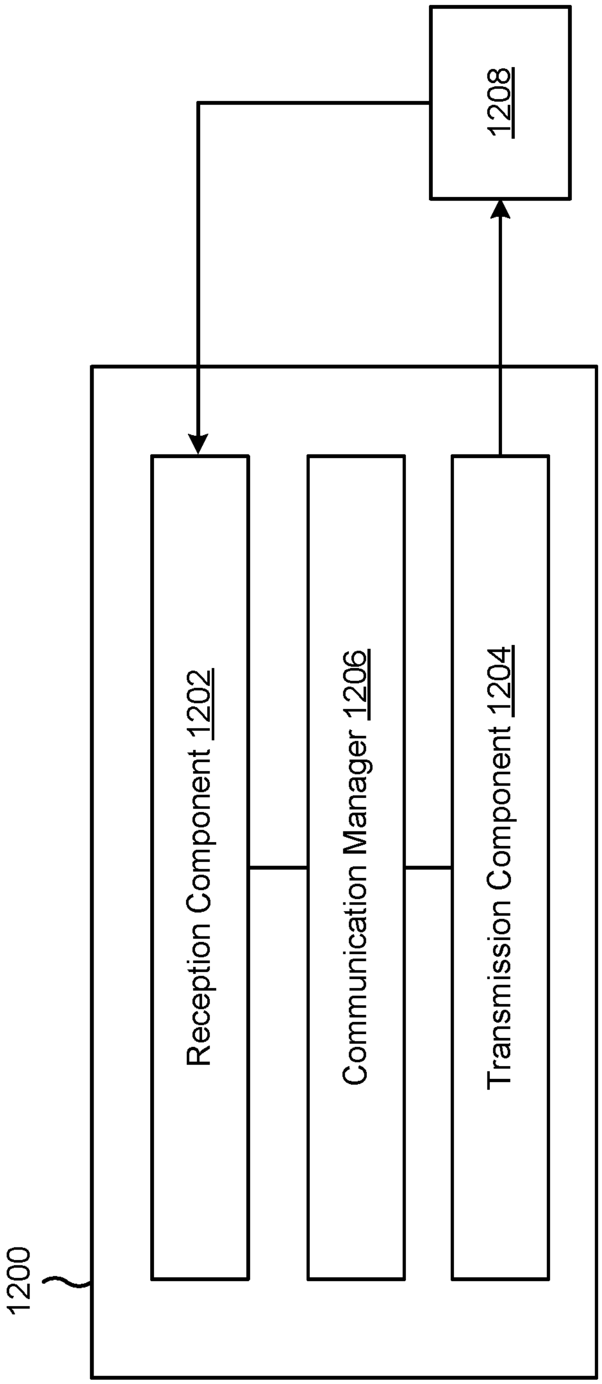
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-7. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive an AGC allocation capability or a preferred AGC allocation. The transmission component 1204 may transmit an AGC allocation configuration for a first AGC allocation to a Tx UE, the first AGC allocation being based, at least in part, on the AGC allocation capability or the preferred AGC allocation. The transmission component 1204 may transmit an AGC allocation activation signal for a second AGC allocation to the Tx UE. The transmission component 1204 may transmit a sidelink grant, to the Tx UE, the sidelink grant being for a third AGC allocation for a transport block from the Tx UE to an Rx UE.

The reception component 1202 may receive the second AGC allocation based, at least in part, on the signal measurement report or a transmit power adjustment.

The communication manager 1206 may determine the third AGC allocation based, at least in part, on one or more of a sidelink buffer status report or a quality of service associated with a destination identifier of a logical channel group.

The transmission component 1204 may transmit the AGC allocation activation signal to the Tx UE via MAC-CE signaling.

The transmission component 1204 may transmit the sidelink grant for the third AGC allocation is transmitted via downlink control information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by an Rx UE, comprising: receiving an AGC allocation configuration for a first AGC allocation; and receiving one or more of an AGC allocation activation signal or an AGC allocation indication, the AGC allocation activation signal being associated with a second AGC allocation and the AGC allocation indication being associated with a third AGC allocation for a transport block.

Aspect 2: The method of Aspect 1, further comprising transmitting an AGC allocation capability or a preferred AGC allocation.

Aspect 3: The method of Aspect 2, wherein the AGC allocation capability or the preferred AGC allocation is transmitted via a sidelink interface.

Aspect 4: The method of Aspect 2, wherein the AGC allocation capability or the preferred AGC allocation is based, at least in part, on a minimum or maximum AGC settling time.

Aspect 5: The method of any of Aspects 1-4, further comprising transmitting an indication accepting or rejecting the AGC configuration for the first AGC allocation.

Aspect 6: The method of Aspect 5, wherein the indication accepting or rejecting the AGC configuration for the first AGC allocation is transmitted via a sidelink interface.

Aspect 7: The method of any of Aspects 1-6, further comprising transmitting a signal measurement report.

Aspect 8: The method of Aspect 7, wherein the signal measurement report includes one or more of a reference signal received power or a received signal strength indicator.

Aspect 9: The method of any of Aspects 1-8, wherein the AGC allocation configuration for the first AGC allocation is received via a sidelink interface.

Aspect 10: The method of any of Aspects 1-9, wherein the third AGC allocation is received with the transport block.

Aspect 11: The method of any of Aspects 1-10, wherein the third AGC allocation is received separately from the transport block.

Aspect 12: The method of any of Aspects 1-11, wherein the second AGC allocation includes a different number of AGC symbols than the first AGC allocation.

Aspect 13: The method of any of Aspects 1-12, further comprising performing an AGC procedure based, at least in part, on one of the first AGC allocation, the second AGC allocation, or the third AGC allocation.

Aspect 14: A method of wireless communication performed by a Tx UE, comprising: transmitting an AGC allocation configuration for a first AGC allocation to an Rx UE; and transmitting one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

Aspect 15: The method of Aspect 14, further comprising receiving the AGC allocation configuration from a network node before transmitting the AGC allocation configuration to the Rx UE.

Aspect 16: The method of any of Aspects 14-15, further comprising receiving an AGC allocation capability or a preferred AGC allocation from the Rx UE.

Aspect 17: The method of Aspect 16, further comprising transmitting the AGC allocation capability or the preferred AGC allocation to a network node.

Aspect 18: The method of Aspect 16, wherein the AGC allocation capability or the preferred AGC allocation is received via a sidelink interface.

Aspect 19: The method of Aspect 16, wherein the AGC allocation capability or the preferred AGC allocation is based, at least in part, on a minimum or maximum AGC settling time.

Aspect 20: The method of any of Aspects 14-19, further comprising receiving an indication accepting or rejecting the AGC allocation configuration for the first AGC allocation from the Rx UE.

Aspect 21: The method of Aspect 20, wherein the indication accepting or rejecting the AGC allocation configuration for the first AGC allocation is transmitted via a sidelink interface.

Aspect 22: The method of any of Aspects 14-21, further comprising receiving a signal measurement report from the Rx UE.

Aspect 23: The method of Aspect 22, further comprising updating the first AGC allocation based, at least in part, on the signal measurement report or a transmit power adjustment.

Aspect 24: The method of Aspect 22, wherein the signal measurement report includes one or more of a reference signal received power or a received signal strength indicator.

Aspect 25: The method of any of Aspects 14-24, wherein the AGC allocation configuration for the first AGC allocation is transmitted via a sidelink interface.

Aspect 26: The method of any of Aspects 14-25, wherein the third AGC allocation is transmitted with the transport block.

Aspect 27: The method of any of Aspects 14-26, wherein the third AGC allocation is transmitted separately from the transport block.

Aspect 28: The method of any of Aspects 14-27, wherein the second AGC allocation includes a different number of AGC symbols than the first AGC allocation.

Aspect 29: The method of any of Aspects 14-28, further comprising determining the first AGC allocation based, at least in part, on the AGC allocation capability or the preferred AGC allocation.

Aspect 30: The method of any of Aspects 14-29, further comprising determining the second AGC allocation based, at least in part, on one or more signal measurement reports.

Aspect 31: The method of any of Aspects 14-30, further comprising determining the third AGC allocation based, at least in part, on one or more of a quality of service, a modulation coding scheme, or a peak-to-average power ratio associated with the transport block.

Aspect 32: The method of any of Aspects 14-31, further comprising receiving the AGC allocation activation signal for the second AGC allocation from a network node.

Aspect 33: The method of any of Aspects 14-32, further comprising receiving a sidelink grant for the third AGC allocation from a network node.

Aspect 34: The method of Aspect 33, wherein the sidelink grant for the third AGC allocation is received from the network node via downlink control information.

Aspect 35: A method of wireless communication performed by a network node, comprising: receiving an AGC allocation capability or a preferred AGC allocation; transmitting an AGC allocation configuration for a first AGC allocation to a Tx UE, the first AGC allocation being based, at least in part, on the AGC allocation capability or the preferred AGC allocation; transmitting an AGC allocation activation signal for a second AGC allocation to the Tx UE; and transmitting a sidelink grant, to the Tx UE, the sidelink grant being for a third AGC allocation for a transport block from the Tx UE to an Rx UE.

Aspect 36: The method of Aspect 35, wherein the AGC allocation capability or the preferred AGC allocation is received via sidelink information.

Aspect 37: The method of any of Aspects 35-36, wherein the AGC allocation capability or the preferred AGC allocation is based, at least in part, on a minimum or maximum AGC settling time.

Aspect 38: The method of any of Aspects 35-37, wherein a signal measurement report is based, at least in part, on communications between the Rx UE and the Tx UE.

Aspect 39: The method of Aspect 38, further comprising receiving the second AGC allocation based, at least in part, on the signal measurement report or a transmit power adjustment.

Aspect 40: The method of Aspect 38, wherein the signal measurement report includes one or more of a reference signal received power or a received signal strength indicator.

Aspect 41: The method of any of Aspects 35-40, wherein the AGC allocation configuration for the first AGC allocation is transmitted to the Tx UE via a radio resource control signal.

Aspect 42: The method of any of Aspects 35-41, wherein the sidelink grant indicates the Tx UE to transmit the third AGC allocation with the transport block.

Aspect 43: The method of any of Aspects 35-42, wherein the sidelink grant indicates the Tx UE to transmit the third AGC allocation separately from the transport block.

Aspect 44: The method of any of Aspects 35-43, wherein the first AGC allocation is based, at least in part, on the AGC allocation capability or the preferred AGC allocation.

Aspect 45: The method of any of Aspects 35-44, further comprising determining the third AGC allocation based, at least in part, on one or more of a sidelink buffer status report or a quality of service associated with a destination identifier of a logical channel group.

Aspect 46: The method of any of Aspects 35-45, further comprising transmitting the AGC allocation activation signal to the Tx UE via MAC-CE signaling.

Aspect 47: The method of any of Aspects 35-46, further comprising transmitting the sidelink grant for the third AGC allocation is transmitted via downlink control information.

Aspect 48: An apparatus for wireless communication at a device, comprising a processor; memory coupled with the processor; and instructions stored in the memory and executable by the processor to cause the apparatus to perform the method of one or more of Aspects 1-47.

Aspect 49: A device for wireless communication, comprising a memory and one or more processors coupled to the memory, the one or more processors configured to perform the method of one or more of Aspects 1-47.

Aspect 50: An apparatus for wireless communication, comprising at least one means for performing the method of one or more of Aspects 1-47.

Aspect 51: A non-transitory computer-readable medium storing code for wireless communication, the code comprising instructions executable by a processor to perform the method of one or more of Aspects 1-47.

Aspect 52: A non-transitory computer-readable medium storing a set of instructions for wireless communication, the set of instructions comprising one or more instructions that, when executed by one or more processors of a device, cause the device to perform the method of one or more of Aspects 1-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiving (Rx) user equipment (UE) for wireless communication, comprising:

one or more memories; and one or more processors, coupled to the one or more memories, configured to:

receive, from a transmitting (Tx) UE, an automatic gain control (AGC) allocation configuration for a first AGC allocation; and receive, from the Tx UE, one or more of an AGC allocation activation signal or an AGC allocation indication, the AGC allocation activation signal being associated with a second AGC allocation and the AGC allocation indication being associated with a third AGC allocation for a transport block.

2. The Rx UE of claim 1, wherein the one or more processors are further configured to transmit an AGC allocation capability or a preferred AGC allocation.

3. The Rx UE of claim 2, wherein the AGC allocation capability or the preferred AGC allocation is transmitted via a sidelink interface.

4. The Rx UE of claim 2, wherein the AGC allocation capability or the preferred AGC allocation is based, at least in part, on a minimum or maximum AGC settling time.

5. The Rx UE of claim 1, wherein the one or more processors are further configured to transmit an indication accepting or rejecting the AGC configuration for the first AGC allocation.

6. The Rx UE of claim 5, wherein the indication accepting or rejecting the AGC configuration for the first AGC allocation is transmitted via a sidelink interface.

7. The Rx UE of claim 1, wherein the one or more processors are further configured to transmit a signal measurement report.

8. The Rx UE of claim 7, wherein the signal measurement report includes one or more of a reference signal received power or a received signal strength indicator.

9. The Rx UE of claim 1, wherein the AGC allocation configuration for the first AGC allocation is received via a sidelink interface.

10. The Rx UE of claim 1, wherein the third AGC allocation is received with the transport block.

11. The Rx UE of claim 1, wherein the third AGC allocation is received separately from the transport block.

12. The Rx UE of claim 1, wherein the second AGC allocation includes a different number of AGC symbols than the first AGC allocation.

13. The Rx UE of claim 1, wherein the one or more processors are further configured to perform an AGC procedure based, at least in part, on one of the first AGC allocation, the second AGC allocation, or the third AGC allocation.

14. A transmitting (Tx) user equipment (UE) for wireless communication, comprising:

one or more memories; and one or more processors, coupled to the one or more memories, configured to:

transmit an automatic gain control (AGC) allocation configuration for a first AGC allocation to a receiving UE (Rx UE); and transmit one or more of an AGC allocation activation signal or an AGC allocation indication, the AGC allocation activation signal being associated with a second AGC allocation to the Rx UE and the AGC allocation indication being associated with a third AGC allocation for a transport block to the Rx UE.

15. The Tx UE of claim 14, wherein the one or more processors are further configured to receive the AGC allocation configuration from a network node before transmitting the AGC allocation configuration to the Rx UE.

16. The Tx UE of claim 14, wherein the one or more processors are further configured to receive an indication accepting or rejecting the AGC allocation configuration for the first AGC allocation from the Rx UE.

17. The Tx UE of claim 14,
wherein the one or more processors are further configured to receive a signal measurement report from the Rx UE.

18. The Tx UE of claim 14,
wherein the AGC allocation configuration for the first AGC allocation is transmitted via a sidelink interface.

19. The Tx UE of claim 14,
wherein the third AGC allocation is transmitted with the transport block.

20. The Tx UE of claim 14,
wherein the third AGC allocation is transmitted separately from the transport block.

21. The Tx UE of claim 14,
wherein the second AGC allocation includes a different number of AGC symbols than the first AGC allocation.

22. The Tx UE of claim 14,
wherein the one or more processors are further configured to determine the first AGC allocation based, at least in part, on an AGC allocation capability or a preferred AGC allocation.

23. The Tx UE of claim 14,
wherein the one or more processors are further configured to determine the second AGC allocation based, at least in part, on one or more signal measurement reports.

24. The Tx UE of claim 14,
wherein the one or more processors are further configured to determine the third AGC allocation based, at least in part, on one or more of a quality of service, a modulation coding scheme, or a peak-to-average power ratio associated with the transport block.

25. The Tx UE of claim 14,
wherein the one or more processors are further configured to receive the AGC allocation activation signal for the second AGC allocation from a network node.

26. The Tx UE of claim 14,
wherein the one or more processors are further configured to receive a sidelink grant for the third AGC allocation from a network node.

27. A network node for wireless communication, comprising:
one or more memories; and
one or more processors, coupled to the one or more memories, configured to:
receive an automatic gain control (AGC) allocation capability or a preferred AGC allocation;
transmit an AGC allocation configuration for a first AGC allocation to a transmitting user equipment (UE) (Tx UE), the first AGC allocation being based, at least in part, on the AGC allocation capability or the preferred AGC allocation;
transmit an AGC allocation activation signal for a second AGC allocation to the Tx UE; and
transmit a sidelink grant, to the Tx UE, the sidelink grant being for a third AGC allocation for a transport block from the Tx UE to a receiving UE (Rx UE).

28. The network node of claim 27,
wherein the sidelink grant indicates the Tx UE to transmit the third AGC allocation with the transport block.

29. The network node of claim 27,
wherein the sidelink grant indicates the Tx UE to transmit the third AGC allocation separately from the transport block.

30. A method of wireless communication performed by a receiving (Rx) user equipment (UE), comprising:
receiving, from a transmitting (Tx) UE, an automatic gain control (AGC) allocation configuration for a first AGC allocation; and
receiving, from the Tx UE, one or more of an AGC allocation activation signal or an AGC allocation indication, the AGC allocation activation signal being associated with a second AGC allocation and the AGC allocation indication being associated with a third AGC allocation for a transport block.

* * * * *